W. L. CORNELL.
AIR MOISTENING ATTACHMENT FOR INCUBATORS.
APPLICATION FILED JULY 23, 1914.
1,220,497.   Patented Mar. 27, 1917.
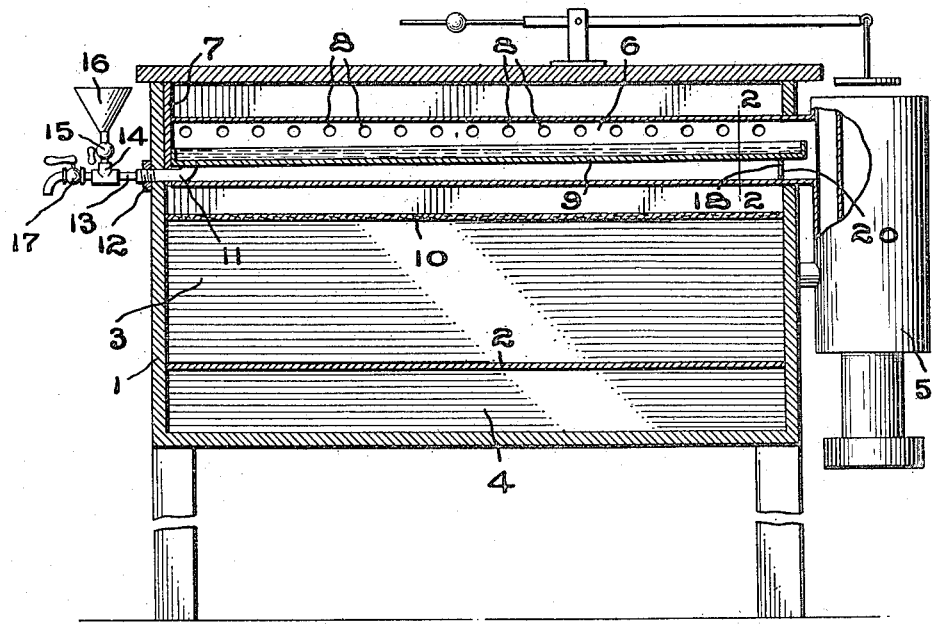
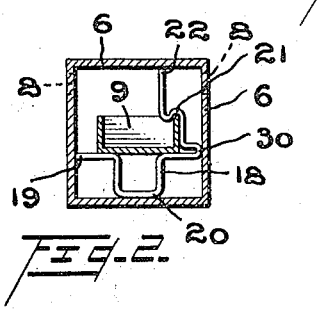
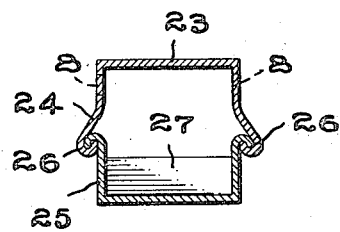
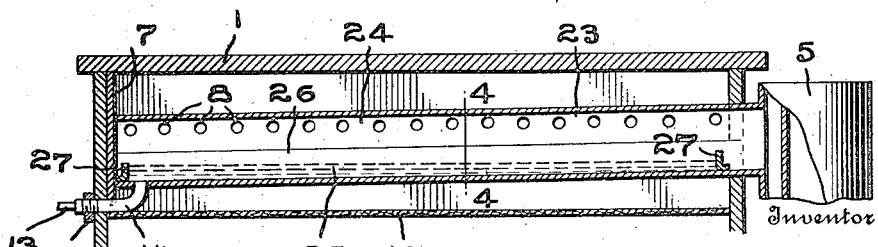
Witnesses  Inventor
William L. Cornell,
By Joshua R. H. Potts.
Attorney

UNITED STATES PATENT OFFICE.

WILLIAM LANSING CORNELL, OF BROWN MILLS, NEW JERSEY.

AIR-MOISTENING ATTACHMENT FOR INCUBATORS.

1,220,497.   Specification of Letters Patent.   Patented Mar. 27, 1917.

Application filed July 23, 1914. Serial No. 852,589.

*To all whom it may concern:*

Be it known that I, WILLIAM L. CORNELL, a citizen of the United States, residing at Brown Mills, in the county of Burlington and State of New Jersey, have invented certain new and useful Improvements in Air-Moistening Attachments for Incubators, of which the following is a specification.

My invention relates to improvements in air moistening attachments for incubators, the object of the invention being to provide in the hot air pipe inside of the incubator, a receptacle for water, which by reason of the temperature of the air is readily taken up by the air and insures a constant supply of moist warm air to the incubator.

A further object is to provide a water receptacle within the hot air pipe of an incubator, so that the hot air may move all around the water receptacle and provide improved means for holding the water receptacle in proper position in the air pipe, and provide improved means for filling and draining the receptacle.

A further object is to provide improvements of the character stated which will add but little to the cost of an incubator, and which will insure the proper moistening of the air under all conditions.

With these and other objects in view, the invention consists in certain novel features of construction and combinations and arrangements of parts as will be more fully hereinafter described and pointed out in the claims.

In the accompanying drawings:

Figure 1 is a view in longitudinal section through an incubator illustrating my improvements.

Fig. 2 is a view in section on an enlarged scale on the line 2—2 of Fig. 1.

Fig. 3 is a fragmentary view in longitudinal section illustrating a modification, and Fig. 4 is a view in cross section on an enlarged scale on the line 4—4 of Fig. 3.

1 represents an incubator casing divided by a partition 2 into an upper egg chamber 3, and a lower chick chamber 4 as is common with incubators in general use.

5 represents the ordinary air heater located at one end of the incubator casing and communicating with a horizontal air pipe 6 located in the upper portion of the casing 1, and having its end held tightly against an asbestos sheet 7 to compel the air entering the opposite end of the air pipe to pass out through perforations 8 in the pipe near its upper side.

Referring to Figs. 1 and 2, 9 represents a tray which is located within the pipe 6, and is adapted to contain water. This tray 9 extends substantially throughout the length of the pipe 6, but is preferably appreciably narrower than the pipe and spaced above the bottom of the pipe to allow the air a free circulation all around the tray, to heat the tray and the water therein, and to compel the air to take up the necessary amount of moisture before passing through the perforations 8.

10 is a felt sheet which is supported in the incubator between the pipe 6 and the egg chamber 3, and serves to thoroughly filter the air, and is kept moist by the warm air escaping from the pipe 6. To the bottom of the tray 9, at one end, I secure an elbow 11 which extends through the end wall of casing 1, and is provided with a jam nut 12, so that when this nut 12 is screwed home, the end of tray 9 is drawn tightly against the asbestos sheet 7 and is held against movement in either direction.

The elbow 11 is connected by a short pipe 13 with a T-coupling 14, which latter supports a cock 15 having a funnel 16 at its upper end. A faucet 17 also connects to the T-coupling 14, and when this faucet 17 is opened, the tray can be drained. The funnel 16 is to facilitate the filling of the tray, and it is, of course, to be understood that when the cock 15 is opened, the faucet 17 will be closed, so that the water will flow into the tray when poured into the funnel.

The end of the tray 9, adjacent the heater 5, is supported at a slightly higher elevation than the other end of the tray to compel the water to drain thoroughly whenever the faucet 17 is open.

To hold the tray in such position, and to hold it against movement in any direction, I provide an anchor 18 which is composed of a single piece of wire, one end of which bears against a side of the pipe 6 as shown at 19. The wire then extends horizontally for a short distance, and then bent downwardly froming a U-shaped support 20 bearing against the bottom of pipe 6. The wire then extends horizontally to the other wall of the pipe 6 as shown at 30, then extends back to the tray 9, thence up beside the tray 9, and over the edge thereof as shown at 21, whereby the tray is connected to the anchor and held against independent movement, and the extreme end of the wire then extends vertically and bears against the top of the pipe as shown at 22, so that the anchor cannot move either horizontally or vertically, and the tray is held against movement in any direction. The anchor therefore serves to center the tray relative to the pipe and to support the tray at the proper angle. By reason of this construction, the tray is securely held and is not displaced during transportation or ordinary handling.

In Figs. 3 and 4, I illustrate a modification in which I construct an air pipe 23 corresponding to air pipe 6 of half sections 24 and 25. The upper half section may be of any metal such for example as galvanized iron, while the lower section 25 is of copper or other similar metal which will withstand the action of the water.

These sections 24 and 25, at their adjacent edges are connected by seams 26 or other securing means, and in the bottom section 25, I provide partitions 27 extending upwardly from the bottom of the pipe and forming between them a receptacle for water.

In this modification, the elbow 11 is connected directly to the bottom of the pipe 23, but in other respects the construction will be precisely like that above described in connection with Figs. 1 and 2.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with an incubator, and a warm air induction pipe located horizontally in the upper portion of the incubator and having perforations therein, of a tray positioned longitudinally inside of the air pipe, and a wire anchor connected to one end of the tray and holding the same in the pipe and against lateral or vertical movement.

2. The combination with an incubator, and a warm air induction pipe located horizontally in the upper portion of the incubator, and having perforations in its sides adjacent its top, of a tray positioned longitudinally inside of the air pipe, said tray adapted to contain water, means at one end of the incubator for filling the tray, and means adjacent the other end of the incubator for anchoring the tray against movement in the pipe, substantially as described.

3. The combination with an incubator, and a warm air induction pipe located horizontally in the upper portion of the incubator, and having perforations in its sides adjacent its top, of a tray positioned longitudinally inside of the air pipe, said tray adapted to contain water, means at one end of the incubator for filling the tray, means adjacent the other end of the incubator for anchoring the tray against movement in the pipe, said last-mentioned means comprising a wire bent forming portions engaging all sides of the pipe and having interlocked engagement with the tray, substantially as described.

4. A heater in combination with a warm air induction pipe leading therefrom, a tray positioned within said pipe and means for anchoring the tray in position comprising a wire bent to form portions engaging all sides of the pipe and having interlocking engagement with the tray, substantially as described.

In testimony whereof I have signed my name to this specification in the presence of two subscribing witnesses.

WILLIAM LANSING CORNELL.

Witnesses:
  EDGAR W. TAYLOR,
  JOHN TAYLOR.

Copies of this patent may be obtained for five cents each, by addressing the "Commissioner of Patents, Washington, D. C."